United States Patent [19]
Wills

[11] 4,135,077
[45] Jan. 16, 1979

[54] LASER BREAD BROWNING APPARATUS

[76] Inventor: Kendall S. Wills, 10903 Vanderford, Houston, Tex. 77072

[21] Appl. No.: 724,027

[22] Filed: Sep. 16, 1976

[51] Int. Cl.² ............................................. A47J 37/00
[52] U.S. Cl. .................................. 219/121 L; 426/243; 426/466; 99/386; 99/393
[58] Field of Search ............ 219/121 LM, 121 L, 105, 219/150, 151, 152, 72, 10.55 E; 99/401, 99, 443, 389, 386, 393, 385; 426/243, 466, 238, 497

[56] References Cited

U.S. PATENT DOCUMENTS

| | | | |
|---|---|---|---|
| 1,656,709 | 1/1928 | Kelly | 99/386 |
| 2,340,354 | 2/1944 | Wells | 426/243 |
| 3,378,446 | 4/1968 | Whittlesey | 219/121 L |
| 3,456,579 | 7/1969 | Woods | 99/401 |
| 3,479,188 | 11/1969 | Theler | 426/238 |
| 3,617,702 | 11/1971 | Flournoy | 219/121 LM X |
| 3,631,713 | 1/1972 | Marom | 219/121 LM X |
| 3,662,676 | 5/1972 | Hartz | 99/443 |
| 3,743,777 | 7/1973 | Hanus | 219/121 LM |
| 3,773,404 | 11/1973 | Moore | 219/121 L |
| 3,817,703 | 6/1974 | Atwood | 426/238 |
| 3,916,143 | 10/1975 | Furrel | 219/121 LM |
| 3,920,951 | 11/1975 | Chovan et al. | 219/121 L |
| 3,943,324 | 3/1976 | Haggerty | 219/121 L |
| 4,028,524 | 6/1977 | Moll | 219/121 L |

FOREIGN PATENT DOCUMENTS

| | | | |
|---|---|---|---|
| 1228562 | 4/1966 | Fed. Rep. of Germany | 99/451 |
| 1591026 | 5/1970 | France | 219/121 LM |

*Primary Examiner*—J. V. Truhe
*Assistant Examiner*—M. Paschall
*Attorney, Agent, or Firm*—Koenig, Senniger, Powers and Leavitt

[57] ABSTRACT

Apparatus for heating the outer surface of an object such as a loaf of bread. The object is conveyed through a heating chamber which has a plurality of apertures therein. A plurality of laser beams of a wavelength that is readily absorbed by the outer surface of the object are generated and each beam is directed through a respective aperture in the chamber. Each beam entering the chamber is diverged to scatter the beam and spread the energy contained therein out over a wider area than that in which the energy is initially contained. The divergent beams are directed into a predetermined zone within the chamber through which the object must pass and the laser radiation within the zone strikes the outer surface of the object and is absorbed thereby to heat the outer surface.

2 Claims, 7 Drawing Figures

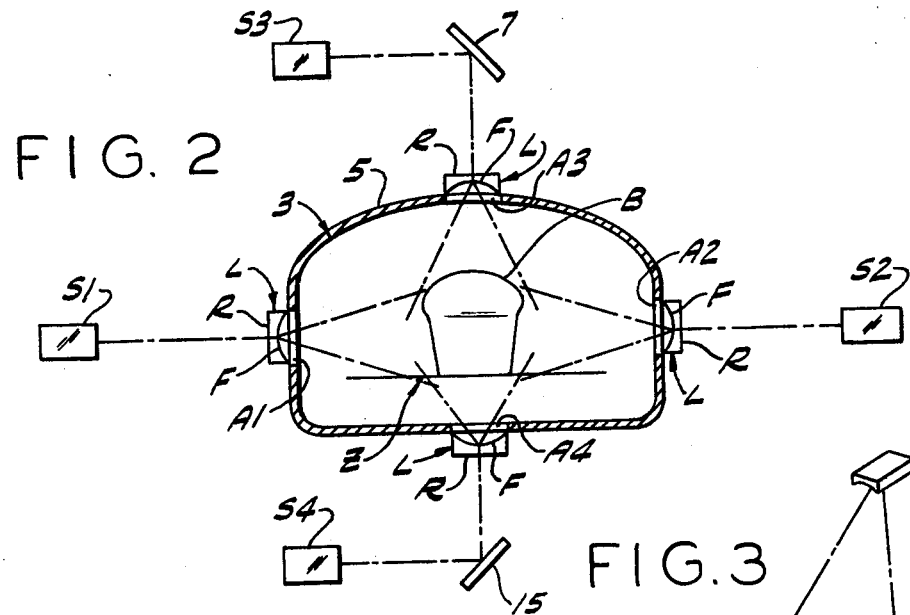
FIG. 2
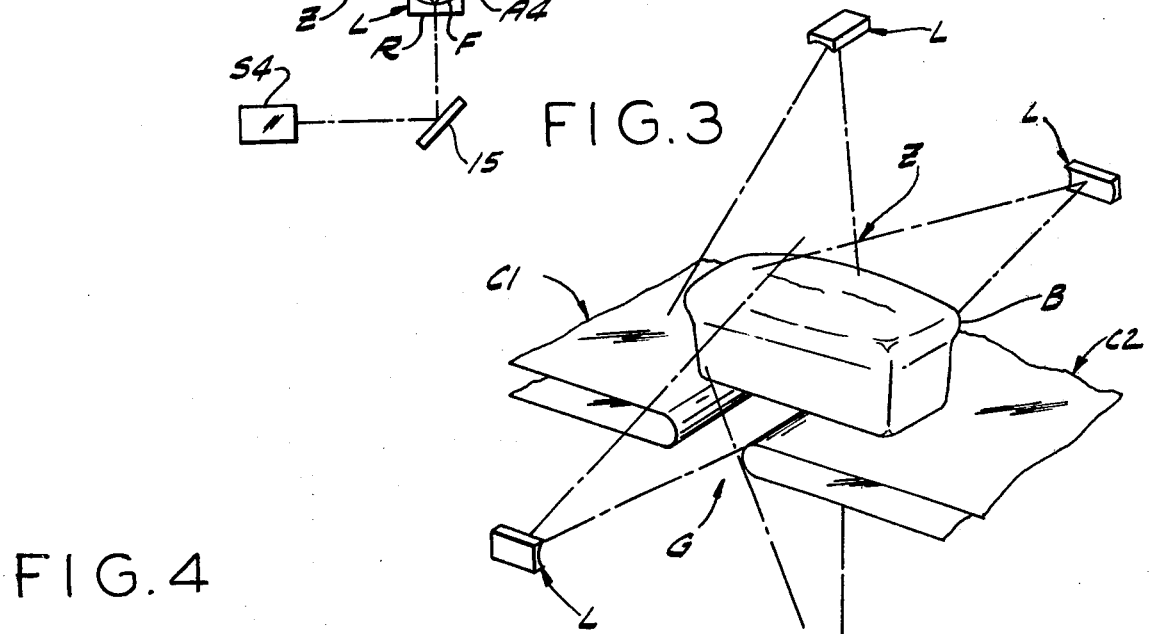
FIG. 3
FIG. 4
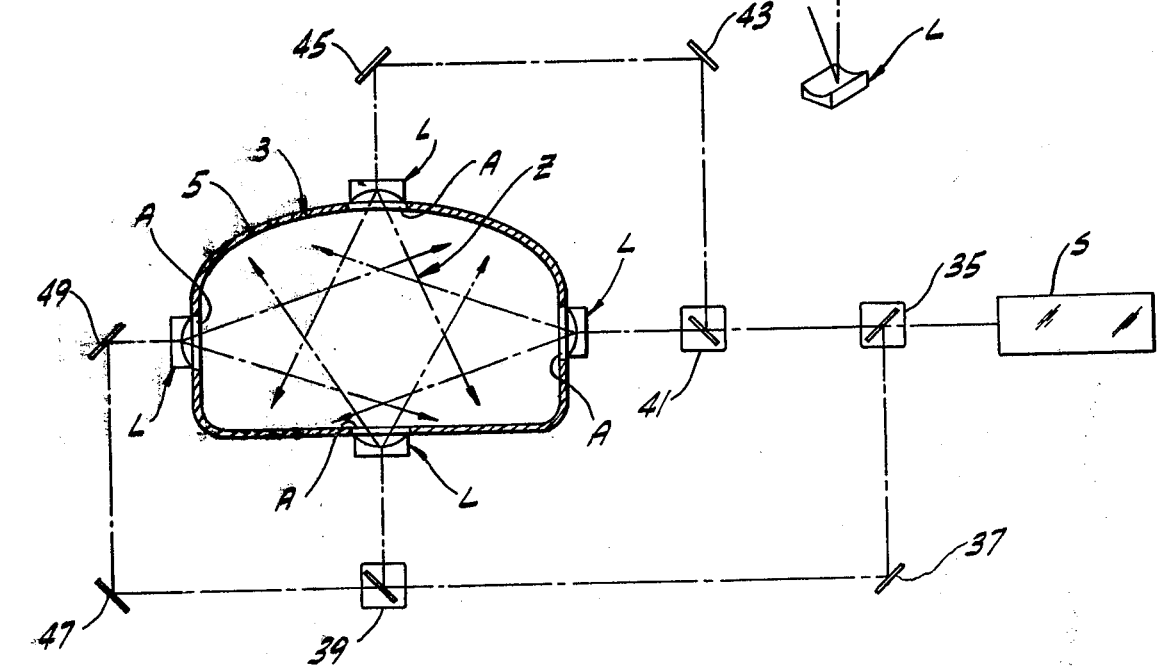

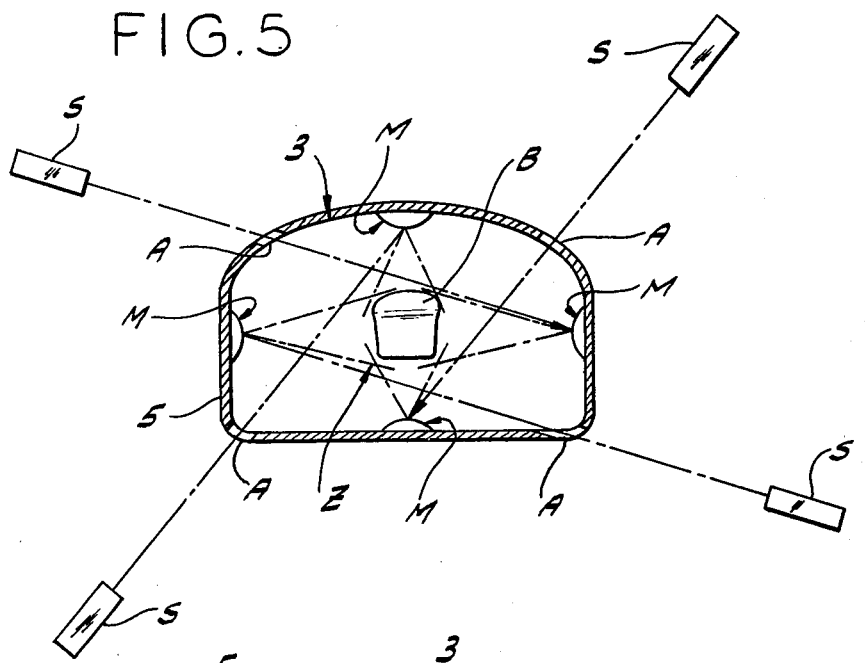
FIG.5
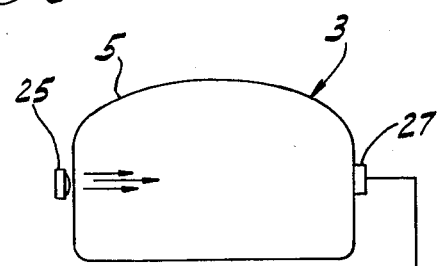
FIG.6
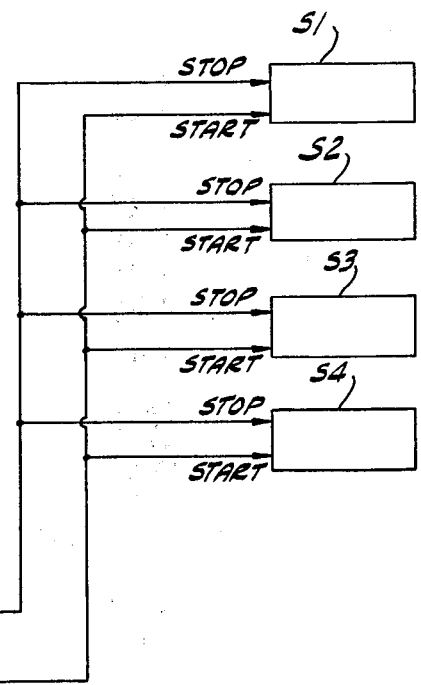
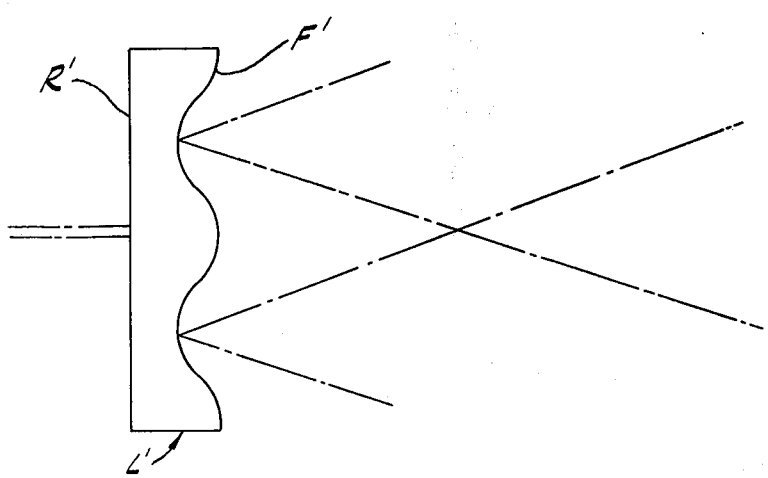
FIG.7

LASER BREAD BROWNING APPARATUS

BACKGROUND OF THE INVENTION

This invention relates to baking equipment and more particularly to such equipment in which lasers are used.

In the bakery industry, large scale baking of bread or similar bakery products is presently performed with gas ovens or ovens using infrared radiators such as lamps. A loaf of bread dough placed in one of these ovens is typically subjected to a 425° F. temperature for twenty-five minutes and this not only bakes the bread, from the outside of the loaf inward, but browns it as well, as i.e., heats the outer surface sufficiently that a crust is formed. Unfortunately, bread baked in this manner tends to lose much of its moisture content during the baking process and this reduces the potential shelf life of the loaf, i.e., that period when the loaf is fresh enough to be sold in grocery stores, supermarkets, etc.

Another way of baking bread is to place it in a microwave oven and subject it to microwave radiation which bakes the loaf from the inside out. Bread can be baked in this manner in as little as seven minutes and this faster operation has the advantage of increasing the output of the bakery. Also, the loaf retains more of its moisture content which increases its shelf life.

A disadvantage of microwave baking, however, is that loaves do not brown when baked in microwave ovens but rather come out of the oven with a whitish appearance due to the lack of crust formation. This leaves the baker with the problem of having to produce a crust on the loaf so that he can continue to offer his customers a loaf of bread whose appearance is familiar to the customers and which they will continue to buy.

SUMMARY OF THE INVENTION

Among the several objects of the invention may be noted the provision of apparatus for heating the outer surface of an object such as a loaf of bread; the provision of such apparatus in which the loaf is heated to form a crust that retains moisture in the loaf and keeps it fresher longer; the provision of such apparatus in which the outer surface of the loaf is evenly heated so that the crust browns uniformly and presents to a customer the appearance that is associated with good taste; the provision of such appartus in which energy for heating the loaf is efficiently supplied; and the provision of such apparatus which is simple in design, reliable and easy to install and operate.

Briefly, apparatus of the invention for heating the outer surface of an object such as a loaf of bread comprises means defining a heating chamber through which the object is conveyed, the means having a plurality of apertures therein. Means are provided for generating a plurality of laser beams of a wavelength that is readily absorbed by the outer surface of the object and for directing each beam through a respective aperture in the chamber defining means. Beam diverging means scatter each beam entering the chamber and spread the energy contained therein out over a wider area than that in which the energy is initially contained. Beam directing means direct the divergent beams into a predetermined zone within the chamber through which the object must pass and the laser radiation within the zone strikes the outer surface of the object and is absorbed thereby to heat the outer surface. Other objects and features will be in part apparent and in part pointed out hereinafter.

BRIEF DESCRIPTION OF THE DRAWINGS

FIG. 2 is a block diagram of the apparatus of FIG. 1;

FIG. 3 illustrates the way in which the heating zone is formed so that laser radiation uniformly strikes the outer surface of an object;

FIG. 4 is a block diagram of another embodiment of the present invention in which only one laser is used;

FIG. 5 is a diagram of still another embodiment of the present invention in which mirrors placed inside the heating chamber are used instead of lenses;

FIG. 6 is a schematic of circuitry for initiating and terminating the lasing action of lasers; and FIG. 7 is a cross-section of a lens which may be used with the apparatus of the present invention for non-uniform heating of an object.

Corresponding reference characters indicate corresponding parts throughout the several views of the drawings.

DESCRIPTION OF THE PREFERRED EMBODIMENTS

Figure 1:
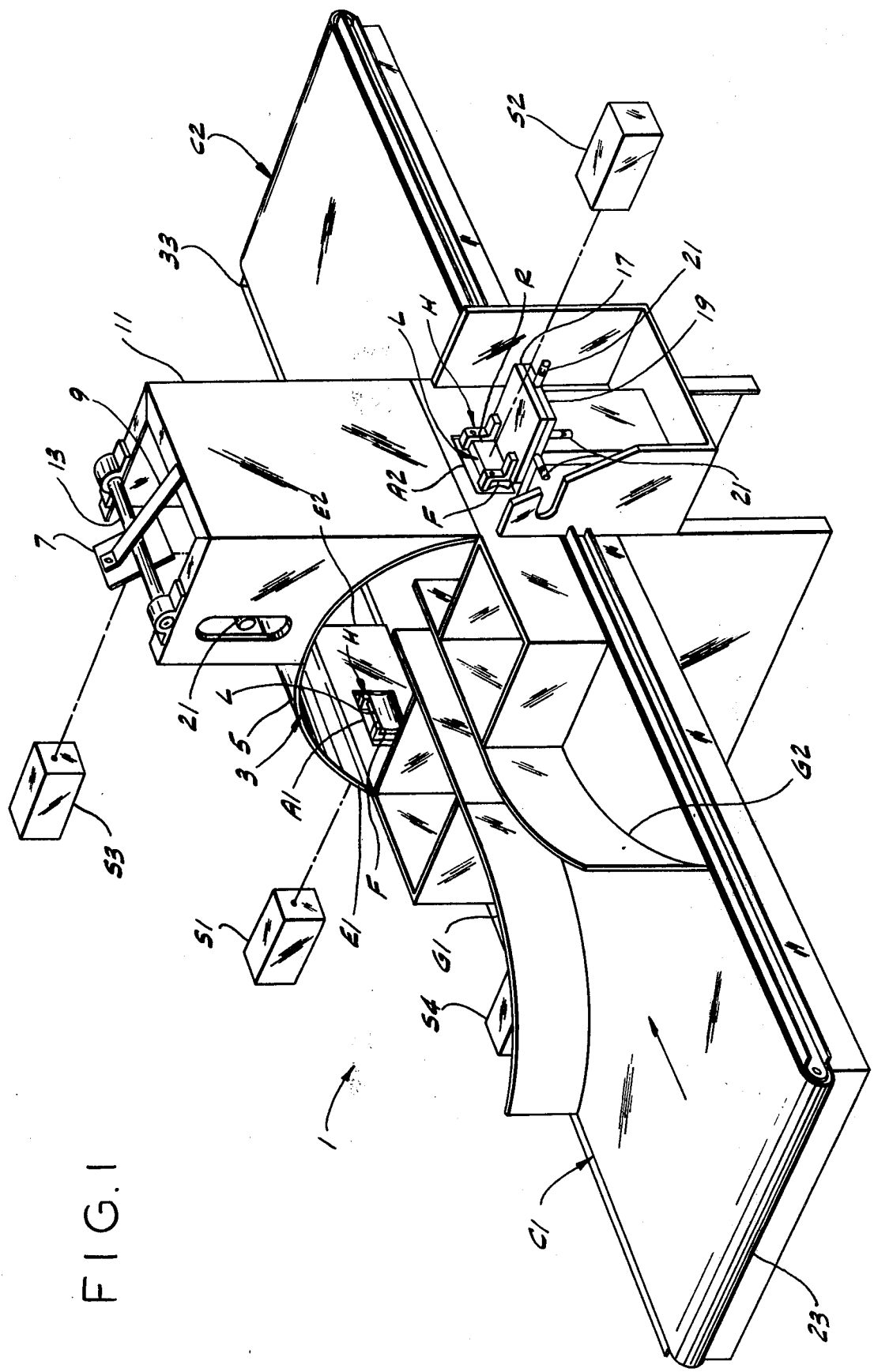
FIG. 1 is a perspective view of apparatus of the present invention for heating the outer surface of an object in which a plurality of lasers are used.

Referring now to the drawings, apparatus of the invention for heating and thereby browning the outer surface of an object is indicated generally at 1. A chamber 3 in which the object, for example, a load B of bread is heated, is partially defined by a tunnel 5. Tunnel 5 has a plurality of apertures A formed in its walls and is open at both ends, one end E1 being the entrance to the tunnel and the other end E2 being the tunnel exit. Browning or heating chamber 3 is further defined by a first conveyor, generally indicated C1, and a second conveyor, generally indicated C2. A loaf B placed on conveyor C1 is transported into tunnel 5 (to chamber 3) transferred from conveyor C1 to conveyor C2, and transported out of the tunnel and away from the heating chamber. As shown in FIG. 3, conveyors C1 and C2 are so positioned with respect to each other that a gap G exists between them. The reason for this gap is discussed hereinafter.

A plurality of lasers S are positioned outside tunnel 5 on suitable supports (not shown) and at distances which are not critical for purposes of this invention but which are in close proximity to the tunnel. Each laser, when energized, emits a beam of coherent radiation of a wavelength readily absorbed by the outer surface of the object and each of the plurality of beams that are generated is directed at one of the apertures A in the tunnel wall. As shown in FIGS. 1 and 2, two of the lasers, S1 and S2, are positioned so that the radiation they emit is beamed directly at apertures A1 and A2, respctively, in the sides of tunnel 5. Radiation from two other lasers, S3 and S4, however, cannot be beamed directly at the respective apertures A3 and A4 in the tunnel. Therefore, a mirror 7 is positioned in the transmission path of the radiation from laser S3 to direct the laser beam downward toward the aperture A3 in the top of tunnel 5. Mirror 7 is mounted on a bracket 9 which is affixed to a housing 11 placed on the outer surface of the tunnel. A bar 13 extends transverse to bracket 9 to support the bracket and the mirror. A similar arrangement is provided for laser S4 with a mirror 15 (see FIG. 2) being positioned to direct the laser beam upward toward the aperture A4 in the bottom of the tunnel.

As the beam from each laser reaches a respective aperture in tunnel 5, it impinges on the rear surface R of a lens L positioned at that aperture. This rear surface is flat, but the front surface F of the lens is concave in shape and diverges the beam transmitted through the lens. As a result, each beam entering chamber 3 is diverged, or scattered, and the energy contained within the beam is spread out over a wider area than that in which it was initially contained. This is best shown in FIG. 2, where it can be seen that prior to reaching a lens L, the energy within the beam emitted by a laser is contained within the rather small cross-sectional area of the beam. However, having passed through lens L, the beam begins to spread out (diverge) and the cross-sectional area of the beam becomes increasingly larger. It will be noted that the more concave the surface F of a lens L is made, the greater is the degree of divergence or dispersion of a beam transmitted through the lens. Also, the lens, which is preferably made of zinc selenide, is available from PTR Optics Corporation of Waltham, Massachusetts.

Each laser beam entering chamber 3 is directed into a predetermined browning zone Z within the chamber. To accomplish this, each lens L is mounted in a lens holder H which is attached to a support 17. Support 17 is affixed to a positioner, generally indicated 19, which is used to rotate the support about three mutually perpendicular axes. Positioner 19 has a micrometer 21 for each of the three axes and each micrometer is individually adjustable to rotate lens L to properly direct the beam of radiation diverged by the lens at the area within chamber 3 forming zone Z. When each lens L is properly positioned, the laser radiation within zone Z uniformly strikes the outer surface of an object transported through chamber 3 and the outer surface is evenly heated. Each positioner 19 may be constructed with components available from Ardel Kinematic of Jamaica, New York under their series designations TT-100 and TT-100Y.

In operation, a loaf B of bread which has been baked in a microwave oven, for example, and thus has a whitish exterior appearance is removed from the pan in which it was baked (depanned) and placed upon an endless belt 23 of conveyor C1. Belt 23 is driven in any conventional manner, e.g., motor driven with a chain drive, to transport loaf B toward entrance E1 of tunnel 5 and heating chamber 3. As the loaf approaches the entrance it encounters a pair of guides G1 and G2, respectively positioned on opposite sides of the upper reach of belt 23. Guides G1 and G2 align loaf B as it approaches the entrance to chamber 3 so that it enters the chamber in a predetermined manner, in this instance endwise.

As load L enters tunnel 5 it interrupts the passage of light between a light source 25 (FIG. 6) positioned on one side of entrance E1 and a light detector 27 positioned on the opposite side of the entrance. When the entrance of the loaf into chamber 3 is thus sensed, light detector 27 supplies a signal via an amplifier 29 to the start input of each laser S and to the input of a timing circuit 31. Circuit 31 is constituted by an integrated circuit chip such as the model number 555 chip manufactured by Motorola Semiconductor Products Incorporated of Phoenix, Arizona. Upon receipt of the start signal, a lasing action is commenced in each laser S and a beam of radiation is emitted by each laser and directed toward a respective aperture A in tunnel 5 as previously discussed.

In the present example, where a loaf of bread is being browned, each laser S, which is preferably a $CO_2$ gas laser, emits a beam of coherent radiation in the infrared portion of the light spectrum, specifically at 10.6A which is a wavelenght readily absorbed by the outer surface of the loaf. Lasers of this type are available from Coherent Radiation of Palo Alto, California under their model designation Everlase 150.

As beams from lasers S1 and S2 reach apertures A1 and A2 respectively, they impinge on the lenses positioned at the apertures and are diverged. Further, the micrometers 21 of the positioner 19 associated with each lens are adjusted so that the beams enter chamber 3 at an angle with respect to the centerline of the chamber, this angle being such that the beams are directed toward the entrance to chamber 3. This permits laser radiation to strike the front end of load B so that it is uniformly heated along with the rest of the loaf's outer surface. As the loaf continues into chamber 3, the sides and top of the loaf are subjected to the radiation within zone Z and begin to brown. To aid in the browning process, the inner surface of tunnel 5 is lined with a reflective material, preferably stainless steel, to reflect laser radiation off the wall and into zone Z.

Referring to FIG. 3, the beam from laser S4 is directed upward by mirror 15 through aperture A4 at the gap G between conveyors C1 and C2. As loaf B is transferred from belt 23 of conveyor C1 to an endless belt 33 of conveyor C2, the upwardly directed radiation passes through gap G and into predetermined browning zone Z, striking; the bottom surface of the loaf to heat and brown it. Thus mirror 15 constitutes means for directing the laser beam from laser 54 upwardly from below gap G, through said gap, and into predetermined zone Z. Further, the micrometers 21 of the positioners 19 associated with the lenses at apertures A3 and A4 are so adjusted that as the diverged beams from lasers S3 and S4 enter chamber 3 they are directed somewhat toward the exit from chamber 3. This permits laser radiation within zone Z to strike the back surface of the loaf and heat it. Belt 33 of conveyor C2, which is also driven in any conventional manner, then transports the now uniformly browned loaf out of chamber 2 to a station where it may be removed from the conveyor and the next operation with the loaf performed.

At the end of a predetermined period which is controlled by timing circuit 31, a stop signal is generated and supplied to each laser. This signal causes termination of the lasing action of each laser and the emission of radiation therefrom ceases.

In order to develop the plurality of laser beams necessary to create heating zone Z, only one laser S need be used as shown in FIG. 4. The beam from laser S is directed toward one of the apertures A in tunnel 5 as before. A beam splitter 35 is interposed between the laser and the aperture. A portion of the laser beam passes through the beam splitter and continues toward the aperture on its original path. The remainder of the beam, however, is reflected at a right angle with respect to the original beam path and is directed toward a mirror 37 which is positioned to reflect the beam toward a beam splitter 39. The portion of the laser beam continuing on the original path is now incident upon a beam splitter 41 which again passes a portion of the beam and directs it toward the original aperture A in tunnel 5. The remainder of the beam is reflected at a right angle to the original beam path and directed toward a mirror 43. Mirror 43 reflects the beam and directs it toward a mirror 45 which further directs the beam toward a second aperture A in the tunnel wall.

A portion of the beam incident on splitter 39 is transmitted through the splitter and directed toward a mirror 47. The remainder of the beam is directed toward a third aperture A in tunnel 5. The beam incident on mirror 47 is reflected toward a mirror 49 which further reflects the beam toward a fourth aperture A in the tunnel. It will be understood that the arrangement of beam splitters and mirrors could be different from that shown in FIG. 4 with the same results being obtained and that more beam splitters and mirrors could be interposed in the various beam paths if, for example, more than four apertures were formed in tunnel 5.

Referring to FIG. 5, another embodiment of the invention is shown in which a plurality of mirrors M are positioned within chamber 3 at preselected locations and are used to diverge each laser beam and direct it toward heating zone Z. The mirrors thus replace the lens L and their associated positioners 19 described hereinabove. Now, when one of the plurality of laser beams approaches an aperture A in the wall of tunnel 5, it passes through the aperture and strikes the reflecting surface of one of the mirrors. The reflecting surface of each mirror is convex in shape and is preferably gold plated. The convex surface of a mirror M diverges the laser beam incident upon it and reflects the diverging beam toward the heating zone Z through which the object must pass.

It may sometimes be desirable to diverge a laser beam non-uniformly so that a portion of heating zone Z is at a higher temperature than an adjacent portion. This situation might occur, for example, where the object is to be subjected to more intense radiation in one area than in another. To achieve this result, lens L previously described is substituted for by a lens L' shown in FIG. 7. The front surface F' of this lens is not concave as is lens L but rather has a cosine shape. As a consequence, a beam impinging on the rear surface R' of the lens is diverged as shown with the center area of the divergent beam being an overlap of the two diverging portions of the original beam. This central area contains more energy than the outer areas of the diverged beam and a central area is created which contains more intense radiation than the other areas of the beam.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for browning the outer surface of a bakery product such as a loaf of bread comprising:
   means defining a browning chamber through which the bakery product is conveyed, said means having a plurality of apertures therein;
   means for generating a plurality of laser beams of a wavelength that is readily absorbed by the outer surface of the bakery product and for directing each beam through a respective aperture in the chamber defining means;
   means for diverging each beam entering the chamber to scatter the beam and spread the energy contained therein out over a wider area than that in which the energy is initially contained, said diverging means including a plurality of lenses, one of which is positioned at each aperture in the chamber defining means and each of which has a substantially flat back surface upon which a laser beam impinges and a generally concave-shaped front surface which diverges a beam transmitted through the lens, so that each laser beam is diverged only as it enters the browning chamber; and
   means for directing the divergent beams into a predetermined zone within the chamber through which the bakery product must pass whereby the laser radiation within the zone strikes the outer surface of the bakery product and is absorbed thereby to brown said outer surface; wherein the chamber defining means includes means forming a tunnel open at both ends, one end being the entrance to the browning chamber and the other end the exit therefrom said tunnel being lined with stainless steel to reflect laser radiation toward the predetermined zone; wherein the chamber defining means further includes a first means for conveying the bakery product into the browning chamber and a second means to which the bakery product is transferred for conveying it away therefrom, said first and second conveyor means being so positioned with respect to each other that a gap exists therebetween and wherein the beam directing means includes means for directing at least one of the laser beams upwardly from below said gap, through said gap, and into said predetermined zone, whereby the bottom surface of the bakery product is exposed to laser radiation within the zone and browned thereby as the object is transferred across the gap between the conveyor means.

2. Apparatus as set forth in claim 1 wherein the chamber defining means includes an entrance and an exit for the bakery product further including guide means positioned on the first conveyor means for aligning a bakery product as it approaches the entrance to the browning chamber so that it enters the chamber endwise and wherein at least one of the lenses is positioned so that the laser beam passing therethrough is directed somewhat toward the entrance of the browning chamber means whereby laser radiation strikes the front of the bakery product, and wherein at least one of the lenses is positioned so that the laser beam passing therethrough is directed somewhat toward the exit of the chamber means whereby laser radiation strikes the rear of the bakery product thereby to uniformly brown the entire outer surface of the bakery product.

* * * * *